US010579392B2

(12) United States Patent
Sankaranarayanan et al.

(10) Patent No.: US 10,579,392 B2
(45) Date of Patent: Mar. 3, 2020

(54) SYSTEM AND METHOD FOR MAPPING PHYSICAL MEMORY WITH MIXED STORAGE CLASS MEMORIES

(71) Applicant: DELL PRODUCTS, LP, Round Rock, TX (US)

(72) Inventors: Vadhiraj Sankaranarayanan, Austin, TX (US); Stuart Allen Berke, Austin, TX (US); Jeffrey Guo, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 97 days.

(21) Appl. No.: 15/876,855

(22) Filed: Jan. 22, 2018

(65) Prior Publication Data

US 2019/0227809 A1 Jul. 25, 2019

(51) Int. Cl.
*G06F 9/46* (2006.01)
*G06F 9/4401* (2018.01)
*G06F 9/30* (2018.01)

(52) U.S. Cl.
CPC .......... *G06F 9/4401* (2013.01); *G06F 9/3004* (2013.01)

(58) Field of Classification Search
None
See application file for complete search history.

(56) References Cited

U.S. PATENT DOCUMENTS

| 9,256,793 | B2 | 2/2016 | Nachimuthu et al. |
| 2015/0024571 | A1 | 1/2015 | Oh |
| 2015/0248430 | A1 | 9/2015 | Hospodor et al. |
| 2016/0231928 | A1* | 8/2016 | Lewis ................. G06F 3/061 |
| 2017/0039164 | A1 | 2/2017 | Ioannou et al. |
| 2017/0177224 | A1 | 6/2017 | Glover et al. |
| 2017/0220463 | A1* | 8/2017 | Malina ............... H04L 67/1097 |
| 2019/0108889 | A1* | 4/2019 | Gholamipour ..... G11C 13/0023 |

* cited by examiner

*Primary Examiner* — Wissam Rashid
(74) *Attorney, Agent, or Firm* — Larson Newman, LLP

(57) ABSTRACT

An information handling system includes a plurality of storage class memory (SCM) devices and a processor. Each SCM device is configured to determine a health indication of the SCM device. The processor is configured to execute code to provide a basic input/output system (BIOS). The BIOS receives the health indications, ranks the SCMs based upon the health indications, determines that a first BIOS function has a first quality of service level, and allocates the first BIOS function to a first SCM based upon the first quality of service level, wherein the first SCM has a highest rank of the SCMs.

20 Claims, 3 Drawing Sheets

SYSTEM AND METHOD FOR MAPPING PHYSICAL MEMORY WITH MIXED STORAGE CLASS MEMORIES

FIELD OF THE DISCLOSURE

This disclosure generally relates to information handling systems, and more particularly relates to mapping physical memory with mixed storage class memories (SCMs).

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a plurality of storage class memory (SCM) devices and a processor. Each SCM device may be configured to determine a health indication of the SCM device. The processor may be configured to execute code to provide a basic input/output system (BIOS). The BIOS can receive the health indications, rank the SCMs based upon the health indications, determine that a first BIOS function has a first quality of service level, and allocate the first BIOS function to a first SCM based upon the first quality of service level. The first SCM may have a highest rank of the SCMs.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
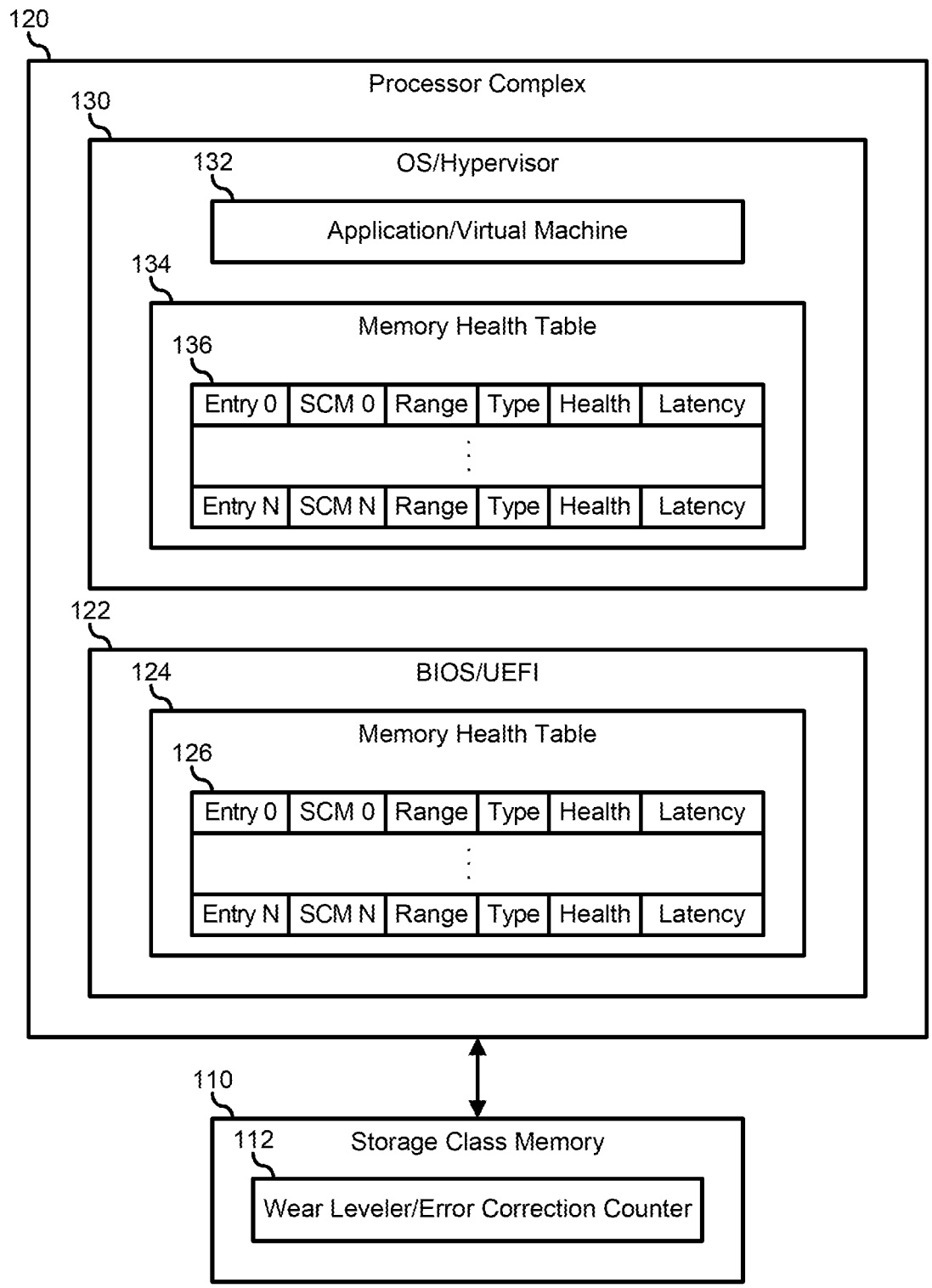
FIG. 1 is a block diagram illustrating an information handling system according to an embodiment of the present disclosure.

FIG. 1 illustrates an information handling system 100 including one or more storage class memory (SCM) 110, and a processor complex 120. SCM 110 includes a wear-leveler and error correction counter 112, described further, below. SCM 110 represents any one of a variety of memory devices that combine the attributes of a traditional memory device, such as byte-addressability, fast access times, and ease of use within a memory subsystem of a processor complex such as processor complex 120, with the attributes of a data storage device, such as high memory storage capacity, write persistence, and data retention, into a single packaged memory device. In particular, SCM 110 provides non-volatile data storage without having external or persistent power applied, with the ability to retain the stored data for long times (typically from three (3) months to over five (5+) years). SCM 110 provides large memory storage capacities (typically up to one (1) terabyte (TB) or more) that are directly accessed for byte or cache-line level granularity via processor based load/store type operations without the necessity to invoke drivers or procedure calls, or can be accessed with block level granularity using storage drivers or procedure calls. SCM 110 further provides sub-microsecond read and write access times that may be within an order of magnitude of typical dynamic random access memory (DRAM) access times (typically around 30 nanoseconds (ns)).

SCM 110 may include memory devices that are associated with various memory storage device package types, such as in a DIMM package, in a Non-Volatile Memory-Express (NVMe) package in accordance with a Non-Volatile Host Controller Interface Specification (NVMHCIS), in a package associated with the Gen-Z Consortium, in a package associated with the Storage Networking Industry Association (SNIA) standard, or in another package as needed or desired. Where SCM 110 represents a memory device that is packaged as a DIMM, it will be understood that the SCM will operate in accordance with a particular memory architecture implemented on the information handling system. For example, SCM 110 may operate in accordance with a Double-Data Rate (DDR) standard, such as a JEDEC DDR4 or DDR5 standard. It will be understood that, where SCM 110 operates in accordance with the DDR5 standard, then the DIMM will be configured to provide two separate memory channels. An example of SCM 110 includes a non-volatile DIMM (NV-DIMM), a 3D) XPoint memory device or other phase-change RAM (PCRAM) device, a resistive-RAM (reRAM) device, a spin transfer torque magnetic RAM (STT-MRAM) device, or another memory device based upon another memory technology, as needed or desired.

SCM 110 is further characterized by consisting of storage elements that are less robust and have less longevity than is typical of dynamic random access memory (DRAM) based devices. In particular, where DRAM based devices have essentially unlimited life-cycle rates, SCM devices have widely varying life-cycle rates, depending on the technology associated with a particular type of SCM device. For example, different types of SCM devices my have expected life-cycle rates anywhere from $10^6$ writes to $10^{15}$ writes. SCM 110 may incorporate wear-leveler and error correction counter 112 to mitigate this problem, and make the SCM a more practical, robust, long-lasting memory device. In general, wear-leveler and error correction counter 112 operates to perform wear leveling on the memory elements of SCM 110 in accordance with a wear leveling algorithm such as a static wear leveling algorithm, a dynamic wear leveling algorithm, or another wear leveling algorithm. As used herein, wear leveling should be understood to incorporate other mechanisms utilized by SCM 110 to increase the robustness and longevity of the SCM. The details of how wear-leveler and error correction counter 112 operates is typically very much dictated by the type of memory device, the architecture of the SCM that incorporates the memory type, the specific vendor of the SCM, and other details. As such, the details of how wear-leveler and error correction counter 112 operates to make SCM 110 more practical and robust are beyond the scope of the present disclosure, and will not be further discussed except as needed to illuminate the present invention.

Wear-leveler and error correction counter 112 operates to provide health information to processor complex 120. In particular, wear-leveler and error correction counter 112 maintains a track of how much wear leveling has been performed on SCM 110, and can thus provide an estimate of the relative health of the SCM. SCM 110 provides the health information to processor complex 120 via a communication interface between the SCM and the processor complex. An example of the communication interface includes a command and data bus or a Serial Presence Detect (SPD) for a DIMM-packaged memory device, a Peripheral Component Interconnect-Express (PCIe)-packaged memory device, or another communication interface, as needed or desired. The health information can include a level-based indication, such as a good-, moderate-, or poor-health indication, or a multi-level-based indication, such as a 1-10 health level indication. The health information can also include a relative health indication, such as a percentage of expected life-span indication. Further, the health information can include a more absolute health indication, such as by providing an expected longevity level for a number of write cycles SCM 110 is expected to last, in combination with a current usage level or, alternatively a current remainder level. Also, the health information can include a number of times that wear leveling has occurred on SCM 110. Other health information may be provided, as needed or desired, and particularly as may be dictated by the specific type of memory device of SCM 110.

Further, SCM 110 provides information as to what type the SCM is, and what the expected latencies are for the SCM. Such information can be referred to as accessibility information. In this way, processor complex 120 is provided with information, with which the processor complex can maintain and manage the overall health and accessibility of the memory subsystems of information handling system 100, and can allocate functions, operations, processes, and applications based upon the health and accessibility of the various memory subsystems, as described further, below. For example, SCM 110 may represent one or more SCM devices that make up a main memory space of information handling system 100. Here, the main memory space of information handling system 100 may include a first SCM device with a high expected life-cycle rate, such as $10^{15}$ writes, a second SCM device with a medium expected life-cycle rate, such as $10^{12}$ writes, a third SCM device with a lower expected life-cycle rate, such as $10^9$ writes, and a fourth SCM device with a short expected life-cycle rate, such as $10^6$ writes. As such, it may be desirable to store information in a particular SCM based upon the number of times the information is expected to be written to the main memory space. For example, the first SCM may be more suitable as video frame buffer space, while the fourth SCM may be more suitable as BIOS shadow RAM.

Processor complex 120 operates to provide the data processing functionality of information handling system 100, such as is typically associated with an information handling system. As such, processor complex 120 represents a data processing apparatus, such as one or more central processing units (CPUs) or processor cores, and the associated data input and output I/O functionality, such as a chipset component, and other I/O processor components. Processor complex 120 operates to execute machine-executable code to perform the data processing tasks associated with information handling system 100.

Processor complex 120 includes a basic input-output system (BIOS)/universal extensible firmware interface (UEFI) 122 and an operating system (OS)/virtual machine hypervisor 130. BIOS/UEFI 122 includes BIOS/UEFI code operable to detect resources within information handling system 100, to provide drivers for the resources, initialize the resources, and access the resources. BIOS/UEFI 122 includes code that operates to detect resources within information handling system 100, to provide drivers for the resources, to initialize the resources, and to access the resources. BIOS/UEFI 122 also includes a memory health table 124 that includes health table entries 126. Each health table entry 126 includes an entry field, a SCM identifier for the SCM associated with the entry, a physical address range of the memory locations of the SCM within the memory map of information handling system 100, an SCM type field that represents a type for the identified SCM, and a health field that includes the health information from SCM 110 as described above.

In a particular embodiment, BIOS/UEFI 122 operates during a pre-OS boot to detect the one or more SCM 110. During a memory initialization phase, BIOS/UEFI 122 detects the attached memory devices and obtains the health and accessibility information from the SCM. For example, BIOS/UEFI 122 can utilize the SPI to access Serial Presence Detect (SPD) data from SCM 110, and the SPD data can include the health and accessibility information. With the health and accessibility information from the SCMs, BIOS/UEFI populates memory health table 124 with an entry 126 associated with each of the SCMs populated in information handling system 100.

In a particular case, BIOS/UEFI 122 operates during other phases of the pre-OS boot, after the memory initialization phase, to allocate the various functions of the BIOS/UEFI to the SCMs based upon a quality of service (QoS) associated with each function, and upon the health and accessibility information in memory health table 124. The QoS for each function may relate to a desired health level of the SCM used for the function, to a desired latency of the SCM used for the function, or to a combination of the desired health level and the desired speed of the SCM used for the function. As used herein, a BIOS/UEFI function shall be understood to represent any activity, either during boot or runtime, of BIOS or UEFI code which is allocated to or otherwise requests a portion of the physical memory space of information handling system 100. An example may include memory allocated as BIOS shadow RAM, option ROM, AGP video card memory, video frame buffer memory, Advanced Programmable Interrupt Controller (APIC) memory, Advanced Configuration and Power Interface (ACPI) memory, memory dedicated to drivers, application programming interfaces (APIs), interrupt vectors, PCI configuration, UART and DMA buffers, or other memory allocations, as needed or desired.

In particular, BIOS/UEFI 122 operates to ascribe a relative rank, or to otherwise classify entries 126 based upon their respective health and accessibility information to derive an ordering of the associated SCMs in terms of their perceived health level. For example, where two or more SCMs are of a same type, BIOS/UEFI 122 can rank the SCMs based upon a simple comparison of their respective health information. On the other hand, for different types of SCMs BIOS/UEFI 122 can perform a more in-depth analysis of the health information provided by each SCM to determine a ranking. For example, where the SCMs each merely provide a number of times that wear-leveling has been performed as its health indication, BIOS/UEFI 122 can include a list of types of SCMs and their associated life-expectancy. Here, BIOS/UEFI 122 can utilize the various health information and the associated life-expectancy information to derive a percentage of the expected remaining life for each SCM, to derive an estimated remaining life-expectancy indication, or another relative health indication, as needed or desired, with which to rank the SCMs. In a particular embodiment, BIOS/UEFI 122 tracks the health indications of the SCMs over time to provide an estimated rate of decline in the health of the SCMs, and utilizes the rate information in ranking the SCMs and DIMMs. In another example, BIOS/UEFI 122 can incorporate the latency information for each SCM into the ranking, or can provide a separate ranking of the SCMs based upon the latency information.

Once BIOS/UEFI 122 has ranked the SCMs, the BIOS/UEFI allocates the functions to the ranked SCMs based upon the functions' respective QoS, with the highest QoS functions being allocated to the highest ranked SCMs, and the lower QoS functions being allocated to the lower ranked SCMs. For example, BIOS code that is deemed critical to the operation of information handling system 100 may be ascribed a high health QoS level, and can be shadowed on pre-OS boot to a SCM with a high health rank to ensure that the likelihood of memory failure is low. Further, firmware for a particular function or device of information handling system may be deemed less critical, can be ascribed a lower health QoS level. As such, the firmware can be loaded to a less highly ranked SCM. Similarly, BIOS code that is invoked often may be ascribed a higher latency QoS, and can be loaded to a SCM with a higher latency rank, and BIOS code that is invoked less often may be ascribed a lower latency QoS, and can be loaded to a SCM with a lower latency rank.

In another embodiment, BIOS/UEFI 122 includes a health rank threshold, such that if any of the SCMs provide a health indication that places them below the health rank threshold, then the BIOS/UEFI takes the particular low-ranked SCMs off line, for example by blocking out the physical memory space from use by information handling system 110. Further, when BIOS/UEFI 122 detects one or more SCM that provides a health indication that places them below the health rank threshold, then the BIOS/UEFI provides an indication that the one or more SCMs have been taken off line. For example, information handling system 100 may include a service processor, such as a Baseboard Management Controller (BMC), an Integrated Dell Remote Access Controller (iDRAC), or another service processor. Here, BIOS/UEFI 122 can communicate with the service processor to provide the indication that the one or more SCMs have been taken off line to a management system remote from information handling system 100. Here, a data center technician can be advised to replace the off-line SCMs with newer, more robust SCMs.

OS/hypervisor 130 operates during OS boot and during runtime to allocate various functions, procedure calls, processes, applications, and virtual machines launched by the OS/hypervisor to the. Henceforth, the functions, procedure calls, processes, applications, and virtual machines will be referred to collectively as application/VM 132. A call to OS/hypervisor 130 to allocate memory for any application/VM 132 may be provided with a QoS level of its own, and can thus be processed in accordance with the present disclosure. As used herein, application/VM 132 shall be understood to represent any activity, either during OS or hypervisor installation or runtime, of OS or hypervisor code which is allocated to or otherwise requests a portion of the physical memory space of information handling system 100. An example may include memory allocated as system operating code, Windows Dynamic Link Libraries (DLLs), heap and stack memory, memory allocated to executable files, data and swap memory regions, kernel code and data, memory mapped shared libraries, or other memory allocations, as needed or desired.

In a particular embodiment, OS/hypervisor 130 utilizes memory health table 124 to allocate application/VM 132 based upon the associated QoS of the application/VM. Here, once BIOS/UEFI 122 has ranked the SCMs, OS/hypervisor 130 allocates application/VM 132 to the ranked SCMs based upon the application/VMs respective QoS, with the highest QoS application/VMs being allocated to the highest ranked available SCMs, and the lower QoS application/VMs being allocated to the lower ranked SCMs. For example, OS or virtual machine hypervisor code may be deemed more critical to the operation of information handling system 100 and can therefore be ascribed a high QoS level. Such OS or virtual machine hypervisor code can be allocated at OS boo to a highly ranked SCM to ensure that the likelihood of memory failure is low. Further, application data may be ascribed a higher QoS than the application code, and so OS/hypervisor 130 and so the application data can be allocated memory from a medium QoS SCM and the application code can be allocated to a lower QoS SCM. Similarly, an application/MV that is invoked often may be ascribed a higher latency QoS, and can be loaded to a SCM with a higher latency rank, and an application/VMIOS that is invoked less often may be ascribed a lower latency QoS, and can be loaded to a SCM with a lower latency rank.

In another embodiment, application/VM 132 includes a health rank threshold, such that if no available SCM provides a health indication above the health rank threshold, then OS/hypervisor 130 may decline to launch the application/VM. In another case, OS/hypervisor 130 launches the application/VM, an allocates application/VM 132 to an SCM with a health rank below the application/VM's health rank threshold, and the OS/hypervisor provides an indication, or example to the service processor, that the application/VM is operating with an allocated SCM that is below the health rank threshold. Here, the data center technician can look to find another information handling system similar to information handling system 100, and that has one or more SCM with a health rank above the health rank threshold for application/VM 132, and can migrate the application/VM to that information handling system.

In another embodiment, OS/hypervisor 130 includes a memory health table 134 similar to memory health table 124. In a first case, OS/hypervisor 130 populates memory health table 134 by copying the contents of memory health table 124. Here, for example, after BIOS/UEFI 122 populates memory health table 124 in the memory initialization phase, and allocates functions of the BIOS/UEFI to the various SCMs, the BIOS/UEFI can pass the resulting memory map and the contents of memory health table 124 to OS/hypervisor 130. OS/hypervisor 130 then allocates memory from SCM 110 based on the QoS of application/VM 132, and upon the ranking of the SCM within memory health table 134. In another embodiment, when OS/hypervisor 130 is launched, the OS/hypervisor can invoke various device specific methods (DSMs) to obtain the health and accessibility information directly from SCM 110, and can assess the health and accessibility information to rank the SCMs in memory health table 134. The ranking can be performed as described above with respect to BIOS/UEFI 122. Further, while memory health table 124 will typically be created during a boot phase of information handling system 100, and will thereafter typically remain static, OS/hypervisor 130 can invoke the DSMs at any time to dynamically update memory health table 134 based upon the most current operating status of SCM 110. For example, when a health indication for SCM 110 changes, the SCM can provide the update to OS/hypervisor 120 and the OS/hypervisor can update entry 136 of memory health table 134 based upon the updated heath indication from the SCM.

In a particular embodiment, if a previously allocated application/VM is allocated to a SCM that has a declining health indicator, OS/hypervisor 130 operates to migrate the change the memory allocation for the application/VM to a healthier SCM, or to migrate the application/VM off of information handling system 100 if no suitable SCM is available.

Figure 2:
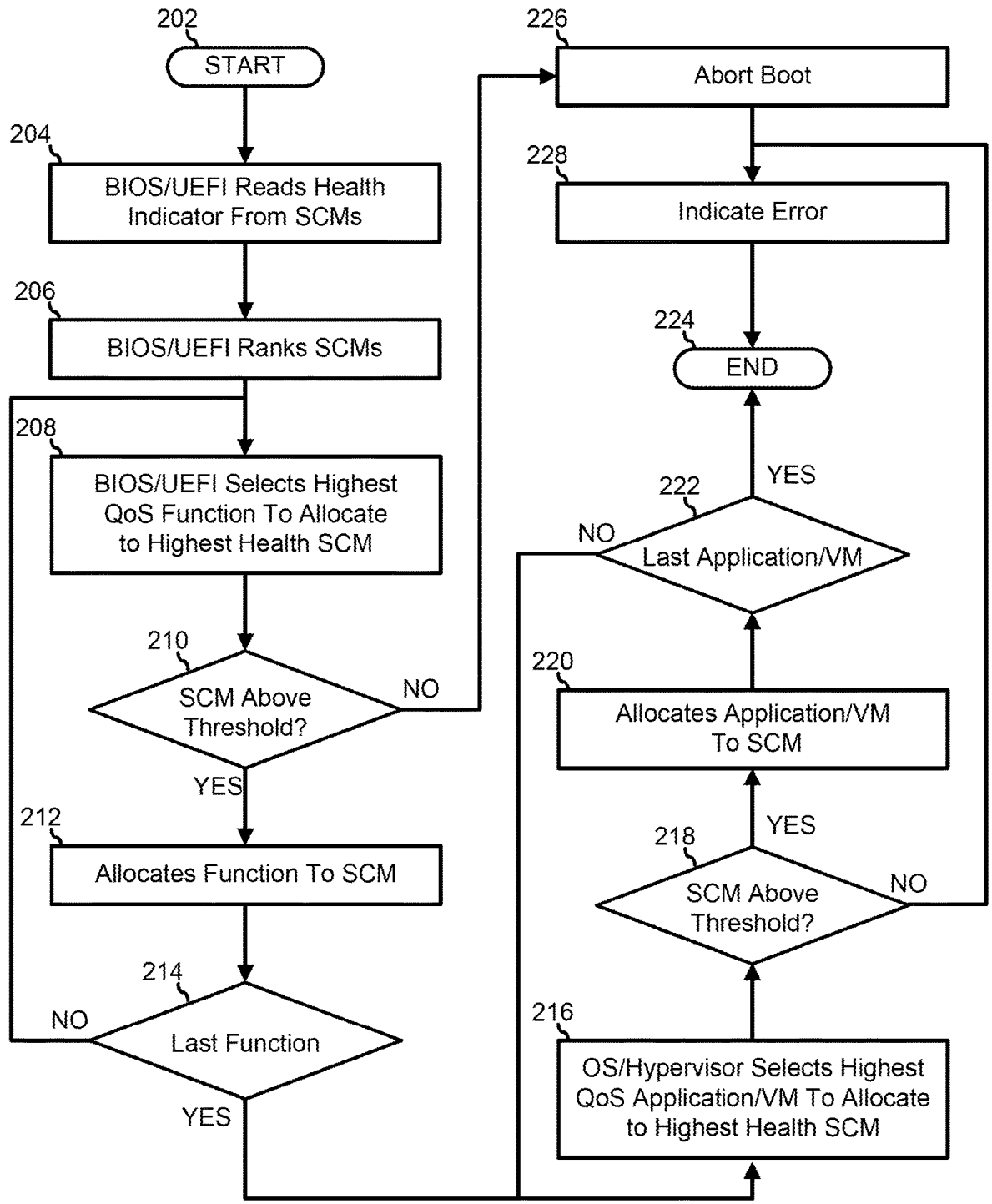
FIG. 2 is a flowchart illustrating a method for mapping physical memory with mixed storage class memories (SCMs)

FIG. 2 illustrates a method for mapping physical memory with mixed SCMs, starting at block 202. A BIOS/UEFI of an information handling system reads health indicators from the SCMs in the information handling system in block 204. Based upon the health indicators from the SCMs, the BIOS/UEFI ranks the SCMs in terms to their relative health in block 206. The BIOS/UEFI selects a function with a highest QoS level and allocates memory for that function from the SCM with the highest health rank in block 208. A decision is made as to whether or not the health rank of the SCM with the highest health rank is above a SCM health threshold for the information handling system in decision block 210. If not, the "NO" branch of decision block 210 is taken, the boot of the information handling system is aborted in block 226, an error indication is provided in block 228, and the method ends in block 224.

If the health rank of the SCM with the highest health rank is above the SCM health threshold, the "YES" branch of decision block 210 is taken and the function is allocated memory from the SCM in block 212. A decision is made as to whether or not the function is the last function of the BIOS/UEFI in decision block 214. If not, the "NO" branch of decision block 214 is taken and the method returns to block 208 where the BIOS/UEFI selects a function with a next highest QoS level and allocates memory for that function from the SCM with the highest health rank. If the function is the last function of the BIOS/UEFI, the "YES" branch of decision block 214 is taken and an OS/hypervisor of the information handling selects an application/VM with a highest QoS level and allocates memory for that application/VM from the SCM with the highest health rank in block 216. A decision is made as to whether or not the health rank of the SCM with the highest health rank is above a SCM health threshold for applications/VMs on the information handling system in decision block 218. If not, the "NO" branch of decision block 210 is taken, an error indication is provided in block 228, and the method ends in block 224.

If the health rank of the SCM with the highest health rank is above the SCM health threshold, the "YES" branch of decision block 218 is taken and the application/VM is allocated memory from the SCM in block 220. A decision is made as to whether or not the application/VM is the last application/VM in decision block 222. If not, the "NO" branch of decision block 222 is taken and the method returns to block 216 where the OS/hypervisor selects an application/VM with a next highest QoS level and allocates memory for that function from the SCM with the highest health rank. If the application/VM is the last application/VM, the "YES" branch of decision block 222 is taken and the method ends in block 224. It will be understood that the method of FIG. 2 can be split such that the OS/hypervisor creates and maintains its own memory health table separately from the memory health table of the BIOS/UEFI, but that otherwise the allocation of SCMs to applications/VMs may be performed as described in the illustrated method.

Figure 3:
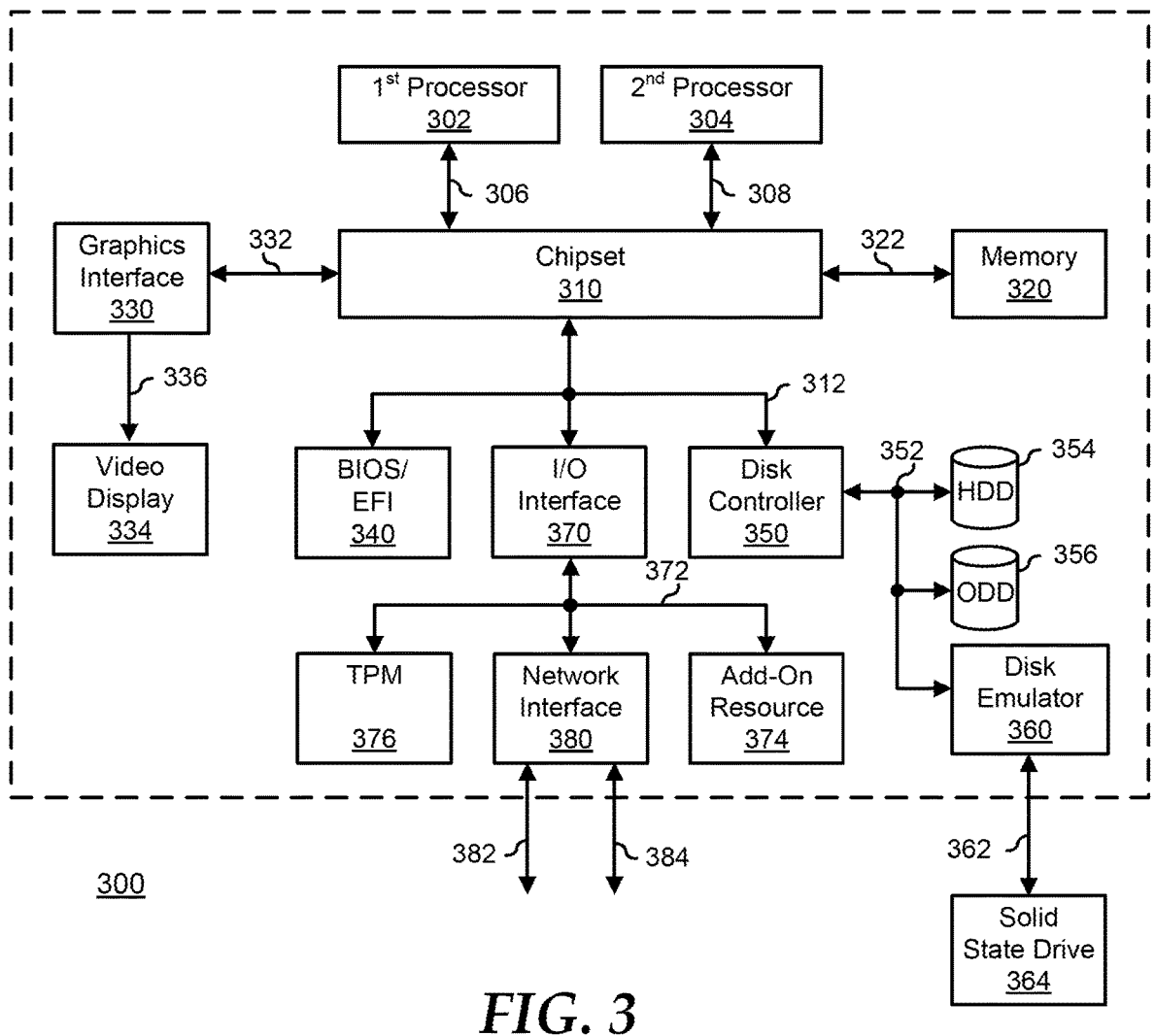
FIG. 3 is a block diagram illustrating a generalized information handling system according to an embodiment of the present disclosure.

FIG. 3 illustrates a generalized embodiment of an information handling system 300 similar to information handling system 100. For purpose of this disclosure information handling system 300 can be configured to provide the features and to perform the functions of the OPF system as described herein. Information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes a processors 302 and 304, a chipset 310, a memory 320, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an input/output (I/O) interface 370, one or more add-on resources 374, a trusted platform module (TPM) 376, a network interface 380, a management device 390, and a power supply 395. Processors 302 and 304, chipset 310, memory 320, graphics interface 330, BIOS/UEFI module 340, disk controller 350, HDD 354, ODD 356, disk emulator 360, SSD 362, I/O interface 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to add-on resource 374, to TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 may include a commercially available BMC product that operates in accordance with an Intelligent Platform Management Initiative (IPMI) specification, such as a Integrated Dell Remote Access Controller (iDRAC), or the like. Management device 390 may further include associated memory devices, logic devices, security devices, or the like, as needed or desired.

Power supply 395 represents one or more devices for power distribution to the components of information handling system 300. In particular, power supply 395 can include a main power supply that receives power from an input power source, such as a wall power outlet, a power strip, a battery, or another power source, as needed or desired. Here, power source 395 operates to convert the power at a first voltage level from the input power source to one or more power rails that are utilized by the components of information handling system. Power supply 395 can also include one or more voltage regulators (VRs) that each receive power from the main power supply and that operate to convert the input voltage to an output voltage that is used by one or more components of information handling system. For example, a VR can be provided for each of processors 302 and 304, and another VR can be provided for memory 320. Power supply 395 can be configured to provide a first power plane that provides power to the host environment, and to provide a second power plane that provides power to the management environment.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a plurality of storage class memory (SCM) devices, each SCM device configured to provide accessibility information for the SCM device, and to determine a health indication of the SCM device, wherein the accessibility information for each particular SCM device provides an indication of data latencies associated with the particular SCM device, and wherein the health indication for each particular SCM device provides an indication of a longevity of the particular SCM device; and
   a processor operable to execute code to provide an operating system configured to:
   receive the health indications;
   rank the SCMs based upon the health indications;
   determine that a first application has a first quality of service level; and
   allocate the first application to a first SCM based upon the first quality of service level, wherein the first SCM has a highest rank of the SCMs.

2. The information handling system of claim 1, wherein the operating system is further configured to:
   determine that a second application has a second quality of service level, the second quality of service level lower than the first quality of service level; and
   allocate the second application to a second SCM based upon the second quality of service level, where the second SCM has a lower rank than the first SCM.

3. The information handling system of claim 2, wherein, prior to allocating the second application to the second SCM, the operating system is further configured to:
   determine that an available memory capacity of the first SCM is less than a demanded memory capacity of the second application, wherein allocating the second application to the second SCM is in response to determining that an available memory capacity of the first SCM is less than a demanded memory capacity of the second application.

4. The information handling system of claim 1, wherein the health indication includes a number of times the respective SCM has performed wear leveling.

5. The information handling system of claim 4, wherein the health indication further includes a number of times the respective SCM is expected to perform the wear leveling.

6. The information handling system of claim 5, wherein the operating system is further configured to:
   calculate a percentage of expected wear leveling available for each SCM based upon the number of times the respective SCM has performed wear leveling and upon the number of times the respective SCM is expected to perform the wear leveling, wherein the SCMs are ranked based upon the percentages of expected wear leveling available.

7. The information handling system of claim 5, wherein the operating system is further configured to
   calculate a number of expected wear leveling cycles available for each SCM as a difference between the number of times the respective SCM has performed wear leveling and the number of times the respective SCM is expected to perform the wear leveling, wherein the SCMs are ranked based upon the numbers of expected wear leveling cycles available.

8. The information handling system of claim 4, wherein:
   the health information further comprises SCM type information for each respective SCM; and
   the operating system is further configured to calculate a percentage of expected wear leveling available for each SCM based upon a number of times the respective SCM has performed wear leveling, and upon a number of times the respective SCM is expected to perform the wear leveling based upon the SCM type information, wherein the SCMs are ranked based upon the percentages of expected wear leveling available.

9. The information handling system of claim 4, wherein:
   the health information further comprises SCM type information for each respective SCM; and
   the operating system is further configured to calculate a number of expected wear leveling cycles available for each SCM as a difference between the number of times the respective SCM has performed wear leveling and the number of times the respective SCM is expected to perform the wear leveling based upon the SCM type information, wherein the SCMs are ranked based upon the numbers of expected wear leveling cycles available.

10. A method, comprising:
receiving, by a processor of an information handling system, health indications from a plurality of storage class memory (SCM) devices, each SCM device configured to determine its health indication, wherein the health indication for each particular SCM device provides an indication of a longevity of the particular SCM device;
receiving, by the processor, accessibility information from the SCM devices, wherein the accessibility information for each particular SCM device provides an indication of data latencies associated with the particular SCM device;
ranking, by the processor, the SCMs based upon the health indications;
determining, by the processor, that a first function has a first quality of service level; and
allocating the first function to a first SCM based upon the first quality of service level, wherein the first SCM has a highest rank of the SCMs.

11. The method of claim 10, further comprising:
determining, by the processor, that a second function has a second quality of service level, the second quality of service level lower than the first quality of service level; and
allocating, by the processor, the second function to a second SCM based upon the second quality of service level, where the second SCM has a lower rank than the first SCM.

12. The method of claim 11, further comprising, prior to allocating the second function to the second SCM:
determining, by the processor, that an available memory capacity of the first SCM is less than a demanded memory capacity of the second BIOS function, wherein allocating the second BIOS function to the second SCM is in response to determining that an available memory capacity of the first SCM is less than a demanded memory capacity of the second BIOS function.

13. The method of claim 10, wherein the health indication includes a number of times the respective SCM has performed wear leveling.

14. The method of claim 13, wherein the health indication further includes a number of times the respective SCM is expected to perform the wear leveling.

15. The method of claim 14, further comprising:
calculating, by the processor, a percentage of expected wear leveling available for each SCM based upon the number of times the respective SCM has performed wear leveling and upon the number of times the respective SCM is expected to perform the wear leveling, wherein the SCMs are ranked based upon the percentages of expected wear leveling available.

16. The method of claim 14, further comprising:
calculating, by the processor, a number of expected wear leveling cycles available for each SCM as a difference between the number of times the respective SCM has performed wear leveling and the number of times the respective SCM is expected to perform the wear leveling, wherein the SCMs are ranked based upon the numbers of expected wear leveling cycles available.

17. The method of claim 13, wherein the health information further comprises SCM type information for each respective SCM, the method further comprising:
calculating, by the processor, a percentage of expected wear leveling available for each SCM based upon a number of times the respective SCM has performed wear leveling, and upon a number of times the respective SCM is expected to perform the wear leveling based upon the SCM type information, wherein the SCMs are ranked based upon the percentages of expected wear leveling available.

18. The method of claim 13, wherein the health information further comprises SCM type information for each respective SCM, the method further comprising:
calculating, by the processor, a number of expected wear leveling cycles available for each SCM as a difference between the number of times the respective SCM has performed wear leveling and the number of times the respective SCM is expected to perform the wear leveling based upon the SCM type information, wherein the SCMs are ranked based upon the numbers of expected wear leveling cycles available.

19. An information handling system, comprising:
a plurality of storage class memory (SCM) devices, each SCM device configured to provide accessibility information for the SCM device, and to determine a health indication of the SCM device, wherein the accessibility information for each particular SCM device provides an indication of data latencies associated with the particular SCM device, and wherein the health indication for each particular SCM device provides an indication of a longevity of the particular SCM device; and
a processor operable to execute code to provide a basic input/output system (BIOS) configured to:
receive the health indications; and
rank the SCMs based upon the health indications;
the processor further to execute code to provide an operating system configured to:
determine that a first application has a first quality of service level; and
allocate the first application to a first SCM based upon the first quality of service level, wherein the first SCM has a highest rank of the SCMs.

20. The information handling system of claim 19, wherein the operating system is further configured to:
determine that a second application has a second quality of service level, the second quality of service level lower than the first quality of service level; and
allocate the second BIOS function to a second SCM based upon the second quality of service level, where the second SCM has a lower rank than the first SCM.

* * * * *